United States Patent Office

2,781,333
Patented Feb. 12, 1957

2,781,333

POLYMERIZABLE COMPOSITIONS CONTAINING POLYGLYCIDYL ESTERS OF POLYCARBOXYLIC ACIDS

Ivor H. Updegraff, Stamford, Conn., assignor to American Cyanamid Company, New York, N. Y., a corporation of Maine No Drawing. Application September 10, 1952, Serial No. 308,920

12 Claims. (Cl. 260—78.5)

This invention relates to the process of preparing reaction products of (1) polyglycidyl esters of polycarboxylic acids, (2) alpha,beta-unsaturated polycarboxylic acids, and (3) a styrene. Still further, this invention relates to a process of co-reacting a polyglycidyl ester of a polycarboxylic acid with an alpha,beta-unsaturated polycarboxylic acid and a styrene to produce a resinous product. Still further, this invention relates to a co-polymerizable mixture of (1) a polyglycidyl ester of a polycarboxylic acid co-reacted with an alpha,beta-unsaturated polycarboxylic acid and (2) a styrene. Still further, this invention relates to the reaction products produced in the practice of the process of the present invention.

The object of the present invention is to produce reaction products of polyglycidyl esters of polycarboxylic acids co-reacted with alpha,beta-unsaturated polycarboxylic acids and a styrene. A further object of the present invention is to co-react a polyglycidyl ester of a polycarboxylic acid, such as diglycidyl phthalate, with an alpha,beta-unsaturated polycarboxylic acid, such as maleic acid or maleic anhydride and a styrene. A still further object of the present invention is to produce a new, heat-hardenable polymerizable composition having, after polymerization, great toughness and low shrinkage, while having excellent adhesion to metals, glass, paper and the like, by co-reacting polyglycidyl esters of polycarboxylic acids with alpha,beta-unsaturated polycarboxylic acids and styrene. These and other objects of the present invention will be discussed more fully hereinbelow.

In the preparation of one of the reactants used in the practice of the process of the present invention, namely the polyglycidyl esters of the polycarboxylic acids, one may adopt an expedient which is well known in the art, as illustrated by the following example. This example is set forth solely for the purpose of illustration and specific enumeration of detail therein should not be interpreted as limitations on the case, except as indicated in the appended claims. All parts are parts by weight.

Preparation of diglycidyl phthalate 198 parts of dipotassium phthalate and 277.6 parts of epichlorohydrin are introduced into a suitable reaction chamber and heated at a temperature above 105–110° C. for about 1–2 hours with a quaternary ammonium salt as a catalyst. The potassium chloride produced is removed either by filtration or washing with water. The excess epichlorohydrin is stripped under vacuum and the resultant product is diglycidyl phthalate. For purification purposes, the diglycidyl phthalate produced may be further vacuum distilled.

Quite obviously, in the preparation of these polyglycidyl esters of the polycarboxylic acids, one may use any of the reactive halohydrins, such as epibromohydrin, epiiodohydrin, epifluorohydrin. As the other reactable component, one may use the alkali and alkali-earth metal salts of the polycarboxylic acids, such as the sodium, potassium, lithium, calcium, barium salts and the like.

In the preparation of these glycidyl esters, any of the polycarboxylic acids may be used, such as the saturated polycarboxylic acids and the unsaturated polycarboxylic acids. Amongst the former acids are all of those which are considered to be polycarboxylic acids which are free from non-benzenoid unsaturation. Representative of this group of acids are such compounds as phthalic acid, oxalic, malonic, succinic, glutaric, sebacic, adipic, pimelic, suberic, azelaic, tricarballylic, citric, tartaric and malic. Amongst the alpha,beta-unsaturated acids which may be used in the practice of the process of the present invention, the principal ones are the alpha,beta-unsaturated polycarboxylic acids, such as maleic, fumaric, aconitic, itaconic and the like. The anhydrides of the acids may also be used whenever available.

Representative of the polyglycidyl esters of polycarboxylic acids which may be used in the practice of the process of the present invention are diglycidyl maleate, diglycidyl fumarate, diglycidyl phthalate, diglycidyl malonate, diglycidyl succinate, diglycidyl sebacate, diglycidyl aconitate and triglycidyltricarballylate and the like. The preferred polyglycidyl ester of a polycarboxylic acid for use in the present invention is the diglycidyl phthalate.

The acids which may be used in co-reaction with the polyglycidyl esters of the polycarboxylic acids may be selected from any of those alpha,beta-unsaturated polycarboxylic acids set forth hereinabove in the discussion of the preparation of the polyglycidyl esters of the polycarboxylic acids per se.

As the third component in the composition of the present invention, one may use a styrene compound such as vinyl benzene or the side chain substituted styrenes, such as alpha methyl styrene, alpha ethyl styrene, alpha chloro styrene or the ring substituted styrenes, such as the ortho, meta or para substituted alkyl styrenes, namely ortho methyl styrene, meta propyl styrene, para ethyl styrene and the like, or the ring substituted halo styrenes, such as ortho, chloro styrene, meta chloro styrene, para chloro styrene. Still further, one may make use of the 2,4-dimethyl styrene, 2,5-dimethyl styrene, 3,4-diethyl styrene, 2,5-dichlorostyrene, 3,5-dichloro styrene and the like. These styrenes may be used either singly or in combination with one another.

The amount of the polyglycidyl ester of the polycarboxylic acid which may be present in the compositions of the present invention may vary between about 5 and 50% by weight based on the total weight of the polyglycidyl esters of the polycarboxylic acids and the alpha,beta-unsaturated polycarboxylic acid. Correspondingly, the amount of the alpha,beta-unsaturated polycarboxylic acid which will be present in the composition may vary between about 50 and 95% by weight based on the total weight of the polyglycidyl esters of the polycarboxylic acid and the alpha,beta-polycarboxylic acid. The amount of the mixture of the polyglycidyl ester of the polycarboxylic acid and the alpha,beta-unsaturated polycarboxylic acid which is present in the composition of the present invention may vary between about 5% and 50% by weight based on the total weight of said mixture and a styrene. Correspondingly, the amount of a styrene which may be present can vary between about 50% and 95% by weight based on the total weight of the polyglycidyl ester of the polycarboxylic acid, the alpha,beta-unsaturated polycarboxylic acid and a styrene.

In the preparation of the compositions of the present invention, it is not necessary to make use of a catalyst but for efficiency in operation it is desired to make use of a catalyst and preferably one of the peroxide catalysts such as benzoyl peroxide, tertiary butyl hydroperoxide, ditertiary butyl peroxide, amongst others well known in the art. The amount of catalyst which will be present will be within the conventional range, namely about 0.01% by weight up to about 5% by weight based on the total weight of the polymerizable composition, but preferably about 0.1–1.0% by weight based on the total weight of the polymerizable composition.

The following examples are set forth primarily for the purpose of illustration and any specific enumeration of detail therein should not be interpreted as limitations on the case, except as indicated in the appended claims. All parts are parts by weight.

EXAMPLE 1

45 parts of diglycidyl phthalate, 30 parts of maleic anhydride and 25 parts of styrene are mixed together thoroughly and are left overnight at room temperature (a period of about 15 hours); are then subjected to a temperature of 55° C. for an additional 15 hours and finally are heat treated at 100° C. for about 7½ hours. The resultant copolymeric reaction product was a well cured, hard amber solid having a density of 1.330 and a Barcol hardness of 45–50.

EXAMPLE 2

30 parts of diglycidyl phthalate and 20 parts of maleic anhydride are introduced into a suitable reaction vessel and warmed to about 80° C. in order to enhance the solution and the material is then cooled to about 25° C. To this solution, there is then added 50 parts of a mixture of a polyester resin (the reaction product of phthalic anhydride, maleic anhydride, propylene glycol and pentaerythritol) and monomeric styrene in a 60–40 weight ratio respectively. This entire solution is then thoroughly mixed and a casting is prepared between two glass plates and cured overnight at room temperature then for 2½ hours at 55° C. and finally for 5 hours at 105° C. The resultant product was an amber colored solid having a density of 1.318 and a Barcol hardness of 45–50.

In Example 1 no catalyst was used whereas in Example 2, 1% of Luperco ATC (a 50/50 mixture of benzoyl peroxide and tricresyl phosphate) was used.

EXAMPLE 3

30 parts of diglycidyl phthalate and 20 parts of maleic anhydride are introduced into a suitable reaction vessel equipped with stirrer and thermometer and are thoroughly mixed and warmed to 80° C. and are allowed to polymerize partially at 25° C. to a viscosity of about 400 poises. To the partially polymerized product, there is added 50 parts of a mixture of styrene and an unsaturated polyester resin (as in Example 2) in a 40–60 weight ratio respectively. 0.33 part of methyl ethyl ketone peroxide is thoroughly mixed into the entire mixture and the resultant product is poured between glass plates and cooled at room temperature (25° C.) for 1 hour and then at 100° C. for 18 hours to produce a resultant product which was an amber colored solid having a density of 1.313 and a Barcol hardness at 46.

I claim:

1. A hardened, cured polymerized mixture of (1) diglycidyl phthalate, (2) maleic anhydride and (3) styrene.

2. A composition of matter comprising the polymerization reaction product of (1) a polyglycidyl ester of a polycarboxylic acid, (2) an ethylenically unsaturated polycarboxylic acid and (3) a member selected from the group consisting of styrene, side-chain halo-substituted styrenes, side-chain alkyl-substituted styrenes, ring-substituted halo styrenes, and ring-substituted alkyl styrenes.

3. A composition of matter comprising the polymerization reaction product of (1) diglycidyl phthalate, (2) an ethylenically unsaturated polycarboxylic acid and (3) a member selected from the group consisting of styrene, side-chain halo-substituted styrenes, side-chain alkyl-substituted styrenes, ring-substituted halo styrenes, and ring-substituted alkyl styrenes.

4. A composition of matter comprising the polymerization reaction product of (1) a polyglycidyl ester of a polycarboxylic acid, (2) maleic anhydride and (3) a member selected from the group consisting of styrene, side-chain halo-substituted styrenes, side-chain alkyl-substituted styrenes, ring-substituted halo styrenes, and ring-substituted alkyl styrenes.

5. A composition of matter comprising the polymerization reaction product of (1) a polyglycidyl ester of a polycarboxylic acid, (2) an ethylenically unsaturated polycarboxylic acid and (3) styrene.

6. A composition of matter comprising a polymerizable mixture of (1) a polyglycidyl ester of a polycarboxylic acid, (2) an ethylenically unsaturated polycarboxylic acid and (3) a member selected from the group consisting of styrene, side-chain halo-substituted styrenes, side-chain alkyl-substituted styrenes, ring-substituted halo styrenes, and ring-substituted alkyl styrenes.

7. A composition of matter comprising a polymerizable mixture of (1) diglycidyl phthalate, (2) an ethylenically unsaturated polycarboxylic acid and (3) a member selected from the group consisting of styrene, side-chain halo-substituted styrenes, side-chain alkyl-substituted styrenes, ring-substituted halo styrenes, and ring-substituted alkyl styrenes.

8. A composition of matter comprising a polymerizable mixture of (1) a polyglycidyl ester of a polycarboxylic acid, (2) maleic anhydride and (3) a member selected from the group consisting of styrene, side-chain halo-substituted styrenes, side-chain alkyl-substituted styrenes, ring-substituted halo styrenes, and ring-substituted alkyl styrenes.

9. A composition of matter comprising a polymerizable mixture of (1) a polyglycidyl ester of a polycarboxylic acid, (2) an ethylenically unsaturated polycarboxylic acid and (3) styrene.

10. A composition of matter comprising a polymerizable mixture of (1) diglycidyl phthalate, (2) maleic anhydride and (3) styrene.

11. A composition of matter comprising the polymerization reaction product of (1) a polyglycidyl ester of a polycarboxylic acid, (2) a member selected from a group consisting of an ethylenically unsaturated polycarboxylic acid and the anhydrides thereof and (3) a member selected from the group consisting of styrene, side-chain halo-substituted styrenes, side-chain alkyl-substituted styrenes, ring-substituted halo styrenes and ring-substituted alkyl styrenes.

12. A composition of matter comprising a polymerizable mixture of (1) a polyglycidyl ester of a polycarboxylic acid, (2) a member selected from a group consisting of an ethylenically unsaturated polycarboxylic acid and the anhydrides thereof and (3) a member selected from the group consisting of styrene, side-chain halo-substituted styrenes, side-chain alkyl-substituted styrenes, ring-substituted halo styrenes and ring-substituted alkyl styrenes.

References Cited in the file of this patent

UNITED STATES PATENTS

| | | |
|---|---|---|
| 2,476,922 | Shokal et al. | July 19, 1949 |
| 2,524,432 | Dorough | Oct. 3, 1950 |
| 2,604,463 | Bilton et al. | July 22, 1952 |
| 2,607,761 | Seymour | Aug. 19, 1952 |